April 19, 1932. R. F. WOOD 1,854,437
APPARATUS FOR DETERMINATION OF DRIFT BY AIRCRAFT
Filed May 25, 1931
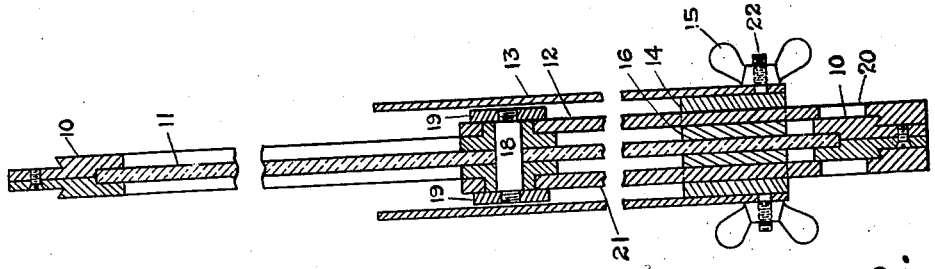
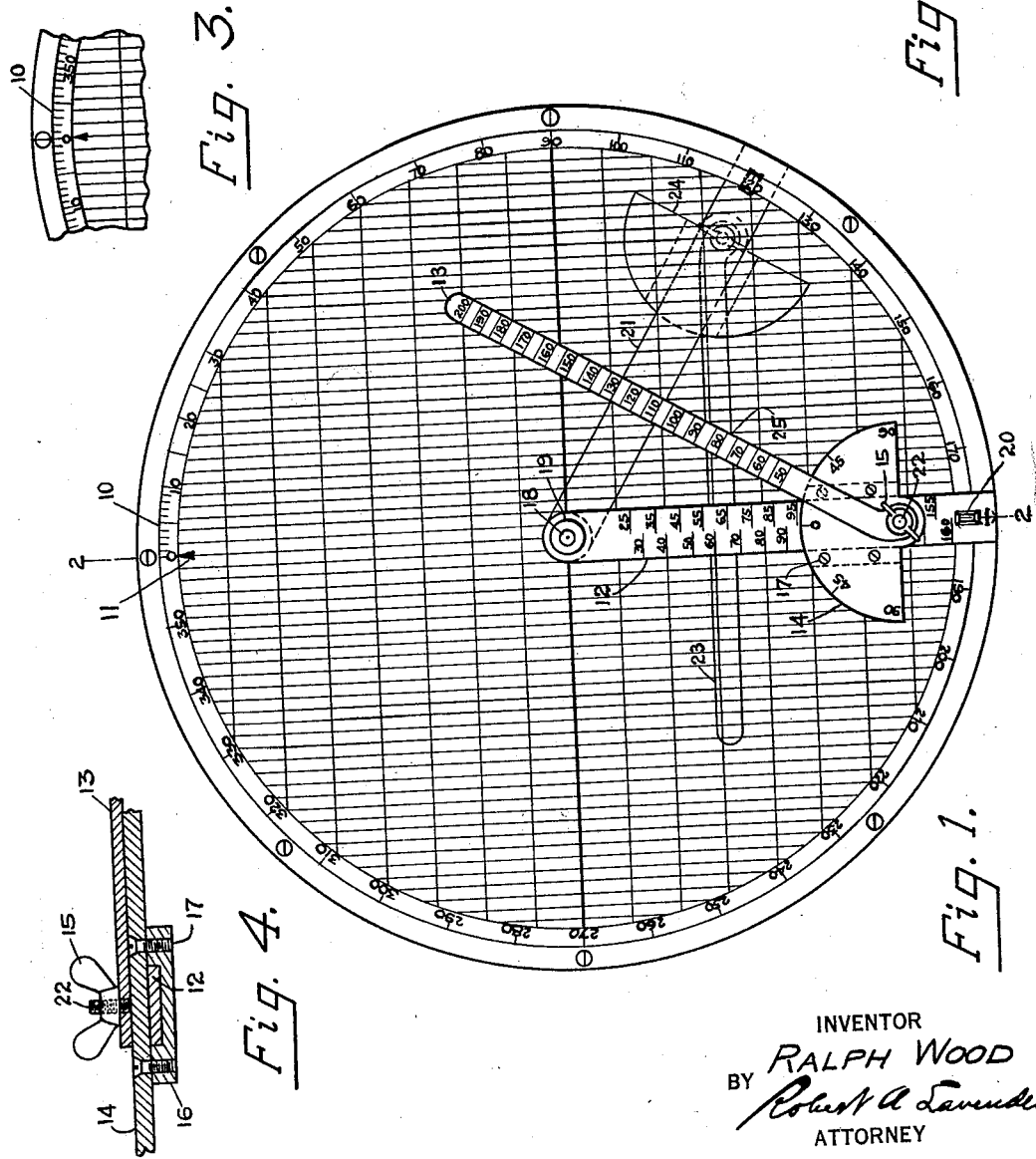
INVENTOR
RALPH WOOD
BY Robert A. Lavender
ATTORNEY

Patented Apr. 19, 1932

1,854,437

UNITED STATES PATENT OFFICE

RALPH F. WOOD, OF THE UNITED STATES NAVY

APPARATUS FOR DETERMINATION OF DRIFT BY AIRCRAFT

Application filed May 25, 1931. Serial No. 539,853.

(GRANTED UNDER THE ACT OF MARCH 3, 1883, AS AMENDED APRIL 30, 1928; 370 O. G. 757)

My invention relates to improvements in the method of and apparatus for determination of drift by aircraft. The apparatus consists of a ring graduated in degrees with a transparent central disk upon which are mounted suitable air-speed arms, ground-speed arms and drift angle indicators.

The objects of my invention are, first, to determine the "wind-point";

Second, to determine the force and direction of the wind;

Third, to determine the course to steer to make good a desired course; and

Fourth, to supply a suitable instrument for practicing my method.

I practice my method and attain these objects by the instrument illustrated in the accompanying drawings, in which:

Fig. 1 is a plan view of the instrument;

Fig. 2 is a section through 2—2 with all speed arms in this plane;

Fig. 3 is a view showing direction of graduations on the under side of the ring of the instrument; and Fig. 4 is a view showing slide and lock-nut arrangement for mounting ground-speed arms on air-speed arms.

Similar numerals refer to similar parts throughout the several views.

Ring 10, Figs. 1, 2 and 3, is graduated in degrees from 0 to 360 on both sides, clockwise on the upper side, viewed from above, and counter-clockwise on the lower side, viewed from below.

Disk 11, Figs. 1 and 2, is rotatably mounted in ring 10, the disk being gripped sufficiently by the two parts of ring 10 to hold the ring and disk in fixed relation after being set. The disk is of transparent celluloid and has a system of equally spaced parallel lines marked thereon. The line passing through the center of the disk has an arrow-head at one end. The auxiliary lines are at right angles to the lines of the main system and have a spacing four times as large as the spacing in the main system. Bolt 18 at its center is for mounting air-speed arms 12 and 21.

Arm 12, Figs. 1 and 2, is the upper air-speed arm and is graduated to represent air speed from 25 to 160 in knots per hour. Opening 20, Figs. 1 and 2, permits the scale on ring 10 to be seen while arm 12 is set thereon. Nut 19 is quite tight so that arm 12 remains at the desired setting.

Drift angle indicator 14 is adjustably mounted on arm 12 by means of slide 16 and screws 17. This is to permit the outer edge of said indicator to be set at the desired air speed on arm 12. The semi-circular edge of the indicator is graduated in degrees from 0 to 90 from the center in opposite directions to permit the ground-speed arm 13 to be set at the desired angle, called the drift angle, to the right or left of the air-speed arm.

Ground-speed arm 13 is mounted on drift angle indicator 14 by screw 22 and wing-nut 15. Arm 13 is so constructed that a continuation of one edge passes through the center of screw 22.

Arm 13 is graduated to represent ground speed from 50 to 200 in knots per hour.

Arms 21 and 23 and indicator 24 are respectively identical to arms 12 and 13 and indicator 14, but are mounted on the lower side of the instrument.

The graduation on all arms and the disk are to the same scale. On the disk, the unit distance in one system of lines is 20 units and in the other system 5 units.

The operation of my invention is as follows:

Set the arrow on disk 11 on the course desired to be made good as indicated on the scale on ring 10. Set air-speed arm 12 on the reverse of the course to be made good. Set the flat edge of indicator 14 on air-speed arm 12, to the air speed, as indicated by the air-speed meter. Set ground-speed arm 13 to the drift angle for this course, right or left, according to the scale on drift angle indicator 14, the drift angle having been determined by a separate instrument. The drift angle is the angle between the course steered and the course made good over the ground.

We now have two sides of the velocity triangle; namely, the air speed and the ground speed. The closing side of the triangle is the wind speed for one end of the wind-speed line must originate at the center of the instrument which is at one end of the air-speed line, and the other end of the wind-speed line must be somewhere along the ground-speed line.

To complete the solution, an additional determination on a new heading is required. This second heading should differ from the first heading by an amount sufficient to give a good graphic intersection between the two ground-speed arms. Preferred, in this respect, is a change of heading toward the wind equal to at least twice the first drift angle.

Set the air-speed arm 21 on the reverse of the new course. Set the outer edge of indicator 24 to the air speed. Set the ground-speed arm 23 to the drift angle for this course, right or left, according to the scale on drift angle indicator 24, the drift angle having been determined by a separate instrument. Right and left on drift angle indicator 24 are opposite the right and left on drift angle indicator 14, and the lower scale on ring 10 is graduated in a counter-clockwise direction, viewed from below, while the upper side is graduated in a clockwise direction, viewed from avove.

The intersection of ground-speed arm 13 with ground-speed arm 23, as seen through the transparent celluloid, gives the wind-point 25 which may be defined as the third point of a velocity triangle where the three sides represent respectively the velocity of a moving body over a surface, its velocity through a medium over that surface and the velocity of the moving medium, the point angle subtending the velocity-of-the-body-through-the-medium side. The line from the center of the instrument 18 to wind-point 25 represents the wind vector in magnitude and direction.

To determine the course to steer to make good the first course, mark wind-point 25 on disk 11; set air-speed arm 12 to the speed at which it is desired to fly; maintain disk 11 on its original setting and rotate air-speed arm 12 and ground-speed arm 13 simultaneously until ground-speed arm 13 is aligned parallel to the primary system of lines on disk 11 and at the same time passes through the wind-point 25. Opening 20 then will show the reverse of the course to steer. The ground speed can be read from the ground-speed arm at the wind-point.

To measure the force and direction of the wind, set ground-speed arm 13 to a drift scale reading of zero; maintain disk 11 at its original setting; rotate arm 12 until arm 13 passes through the center 18 and the wind-point 25. The opening in arm 12 will indicate the direction of the wind on the scale on ring 10 and its force can be measured on the scale on arm 13.

The above is the one-speed, two-course method, which is preferred. It is obvious that the same result may be accomplished by a one-course, two-speed method in which the speed is increased or decreased to such an extent that the graphic solution of the velocity triangle is practical in the same manner as had two observations on different headings been taken.

It will be understood that the above description and accompanying drawings comprehend only the general and preferred embodiment of my invention, and that various changes in construction, proportion and arrangement of parts may be made within the scope of the appended claims, and without sacrificing any of the advantages of my invention.

The herein described invention may be manufactured and used by or for the Government of the United States for governmental purposes without the payment to me of any royalties thereon.

What I claim is:

1. An aerial navigational instrument for the determination of the wind point, the force and direction of the wind, and the course to steer to make good a desired course, the air speed and drift angle having been determined by separate means, comprising a ring, each side of said ring bearing graduations of degrees from 0° to 360°, a transparent disk rotatably mounted within said ring and bearing a system of equally spaced parallel lines, means for securing said disk in fixed relation to said ring, a bar on each side of said disk movable about the center of said disk as an axis and bearing graduations indicative of air speed progressing longitudinally from said center of rotation, means for securing said bars in fixed relation to said ring, a segmental disk movable longitudinally on each of said bars, separate bars mounted respectively on said segmental disks movable about the center of said segmental disks as an axis, the arcs of said segmental disks bearing graduations of degrees indicative of the angular adjustment respectively between said bars and each of the separate bars, means for securing said segmental disks in fixed relation to said bars, said separate bars each bearing graduations indicative of ground speed progressing longitudinally from said center of rotation of said separate bars, an offset in each of said separate bars whereby a continuation of one longitudinal edge of each of said separate bars passes through said center of rotation of said separate bars.

2. An aerial navigational instrument for the determination of the wind point, the force and direction of the wind, and the course to steer to make good a desired course, the air speed and drift angle having been determined by separate means, comprising a ring, each side of said ring bearing graduations of degrees from 0° to 360°, the direction of graduation on one side being clockwise, viewed from above, and on the other side counter-clockwise, viewed from below, a transparent disk rotatably mounted in the plane of, and within, said ring and bearing a primary system of equally spaced parallel lines, the line passing through the center of said disk being distinguished from the other lines of said disk by an arrow-head, and bearing a secondary system of equally spaced parallel lines at right angles to said primary lines, a bar on each side of said disk movable about the center of said disk as an axis, and bearing graduations indicative of air speed progressing longitudinally from said center of rotation, the longitudinal center of said bars passing through said axis, there being an opening near the outermost extremity of each of said bars and on their respective longitudinal centers exposing through said bars a small portion of said respective graduations on said ring, a segmental disk movable longitudinally on each of said bars, the center of each of said segmental disks movable along the longitudinal center of their respective bars, separate bars mounted respectively on said segmental disks movable about the center of said segmental disks as an axis, the arcs of said segmental disks bearing graduations of degrees indicative of angular adjustment respectively between said bars and each of the separate bars, said separate bars each bearing graduations indicative of ground speed, progressing longitudinally from said center of rotation of said separate bars, an offset in each of said separate bars whereby a continuation of one longitudinal edge of each of said separate bars passes through said center of rotation of said separate bars.

R. F. WOOD.